(12) United States Patent
Jamali (10) Patent No.: US 6,243,501 B1
(45) Date of Patent: Jun. 5, 2001

(54) ADAPTIVE RECOGNITION OF DOCUMENTS USING LAYOUT ATTRIBUTES

(75) Inventor: Hamadi Jamali, Redwood City, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/082,648

(22) Filed: May 20, 1998

(51) Int. Cl.[7] ................................................. G06K 9/54
(52) U.S. Cl. ............................ 382/305; 382/224; 707/500
(58) Field of Search ................................... 382/100, 112, 382/141, 173, 176, 177, 180, 190, 206, 218, 299, 224, 284, 305, 306, 312, 321; 707/1, 4, 104, 516, 5, 530, 2, 101, 500–514; 250/559.39; 345/113–115; 358/448–453, 467

(56) References Cited

U.S. PATENT DOCUMENTS

| | | | |
|---|---|---|---|
| 4,949,287 | 8/1990 | Yamaguchi et al. ................ | 364/523 |
| 5,235,652 | * 8/1993 | Nally .................................. | 382/112 |
| 5,303,361 | 4/1994 | Colwell et al. ..................... | 395/425 |
| 5,323,473 | 6/1994 | Lau ..................................... | 382/48 |
| 5,339,412 | 8/1994 | Fueki .................................. | 395/600 |
| 5,359,667 | 10/1994 | Borowski et al. .................. | 382/7 |
| 5,369,508 | 11/1994 | Lech et al. ......................... | 358/462 |
| 5,369,742 | 11/1994 | Kurosu et al. ..................... | 395/147 |
| 5,375,235 | 12/1994 | Berry et al. ........................ | 395/600 |
| 5,388,158 | 2/1995 | Berson ............................... | 380/23 |
| 5,418,946 | * 5/1995 | Mori .................................. | 707/1 |
| 5,438,657 | * 8/1995 | Nakatani ........................... | 707/506 |
| 5,490,217 | 2/1996 | Wang et al. ....................... | 380/51 |
| 5,519,857 | 5/1996 | Kato et al. ......................... | 395/600 |
| 5,519,865 | 5/1996 | Kondo et al. ...................... | 395/600 |

(List continued on next page.)

OTHER PUBLICATIONS

Hull, J.J., "Performance Evaluation for Document Analysis", International Journal of Imaging Systems and Technology (Winter 1996), vol. 7, No. 4, pp. 357–362.

Liang, Jisheng, et al., "Performance Evaluation of Document Layout Analysis Algorithms on the UW Data Set", SPIE, vol. 3027, pp. 149–160.

Maderlechner, G., et al., "Classification of Documents by Form and Content", Pattern Recognition Letters (Nov. 1997), vol. 18, No. 11–13, pp. 1225–1231.

(List continued on next page.)

Primary Examiner—Jay Patel
(74) Attorney, Agent, or Firm—Fenwick & West LLP (57) ABSTRACT

An attribute extracting module (256) extracts attributes from a document (50) input into the system. An attribute comparison module (270) compares extracted attributes with multiple classes (54) of documents. Upon determining that attributes of the document (50) match attributes of one of the classes (54), the document (50) is classified as belonging to the class (54) and is processed in accordance with the system actions associated with the matched class (54). In one embodiment, attributes of the input document (50) are compared to the documents (56) belonging to the matched class (54) which are already on the system. If the system determines that the input document (50) matches one of the existing images (56), the user (240) is alerted that the input document (50) already exists in the system. In a further embodiment, a match is determined in response to a comparison quality measure determined by a quality assessment module (258). The comparison quality measure measures the accuracy of the comparison. If the comparison quality measure exceeds a threshold, a match is determined to have been made. The comparison quality measure examines, among other factors, sizes, locations, and word accuracy values of matching regions within the input document (50) and the matching class (54).

22 Claims, 6 Drawing Sheets

U.S. PATENT DOCUMENTS

| | | | | |
|---|---|---|---|---|
| 5,526,443 | | 6/1996 | Nakayama | 382/229 |
| 5,526,520 | * | 6/1996 | Krause | 395/600 |
| 5,555,362 | | 9/1996 | Yamashita et al. | 395/145 |
| 5,615,112 | * | 3/1997 | Sheng et al. | 707/104 |
| 5,628,003 | * | 5/1997 | Fujisawa et al. | 707/104 |
| 5,642,288 | * | 6/1997 | Leung et al. | 364/478.11 |
| 5,687,250 | * | 11/1997 | Curley et al. | 382/112 |
| 5,710,844 | | 1/1998 | Capps et al. | 382/317 |
| 5,724,593 | | 3/1998 | Hargrave, III et al. | 395/757 |
| 5,757,983 | * | 5/1998 | Kawaguchi et al. | 382/305 |
| 5,764,799 | | 6/1998 | Hong et al. | 382/225 |
| 5,774,580 | * | 6/1998 | Saitoh | 382/176 |
| 5,774,888 | | 6/1998 | Light | 707/5 |
| 5,781,658 | | 7/1998 | O'Gorman | 382/172 |
| 5,781,879 | | 7/1998 | Arnold et al. | 704/9 |
| 5,802,534 | | 9/1998 | Hatayama et al. | 707/530 |
| 5,812,995 | * | 9/1998 | Sasaki et al. | 707/1 |
| 5,818,952 | | 10/1998 | Takenouchi et al. | 382/101 |
| 5,832,470 | | 11/1998 | Morita et al. | 707/1 |
| 5,848,184 | | 12/1998 | Taylor et al. | 382/173 |
| 5,850,480 | | 12/1998 | Scanlon | 382/229 |
| 5,870,089 | | 2/1999 | Fabbio et al. | 345/335 |
| 5,878,385 | | 3/1999 | Bralich et al. | 704/9 |
| 5,905,811 | | 5/1999 | Shiiyama et al. | 382/229 |
| 5,926,565 | | 7/1999 | Froessl | 382/181 |
| 5,930,788 | * | 7/1999 | Wical | 707/5 |
| 5,933,531 | | 8/1999 | Lorie | 382/229 |
| 5,943,443 | | 8/1999 | Itonori et al. | 382/225 |
| 5,950,194 | | 9/1999 | Bennett et al. | 707/3 |
| 5,956,414 | * | 9/1999 | Grueninger | 382/112 |
| 5,963,654 | * | 10/1999 | Prakash et al. | 382/112 |
| 5,991,709 | * | 11/1999 | Schoen | 704/1 |
| 5,999,636 | * | 12/1999 | Juang | 382/112 |
| 5,999,664 | | 12/1999 | Mahoney et al. | 382/305 |
| 6,002,798 | * | 12/1999 | Palmer et al. | 382/176 |
| 6,005,973 | | 12/1999 | Seybold et al. | 382/187 |
| 6,006,226 | | 12/1999 | Cullen et al. | 707/6 |
| 6,009,442 | | 12/1999 | Chen et al. | 707/522 |
| 6,023,528 | | 2/2000 | Froessl | 382/181 |

OTHER PUBLICATIONS

Masataki, H., Sgisaka, Y., "Variable–Order N–Gram Generation by World–Class Splitting and Consecutive Word Grouping", IEEE, 1996, pp. 188–191.

Hull, J., Khoubyari, S., Ho, T., "Word Image Matching as a Technique for Degraded Text Recognition", IEEE, 1992, pp. 665–668.

* cited by examiner

| Class | Action |
|---|---|
| Memo | 1. Extracts keywords at Coordinates 1 |
| | 2 |
| | 3 |
| | 4 |
| | 2. Store Image at Location X |
| | 3. Make copy and archive in location M |
| Invoice | 1. Perform full text OCR |
| | 2. Store image at location Y |
| | 3. Make copy and transmit over network to Location N |

FIG. 6

ADAPTIVE RECOGNITION OF DOCUMENTS USING LAYOUT ATTRIBUTES

TECHNICAL FIELD

This invention pertains to the field of data storage and filing systems, and more specifically, to those systems employing optical character recognition.

BACKGROUND ART

Today's businesses rely heavily on paper for many of their daily functions. For instance, most corporate information resides in paper documents. Also, the majority of transactions necessitate either updating existing paper documents or creating new ones. This dependence on paper will continue to characterize businesses for some time to come. For this reason, businesses are always looking for new and efficient means to handle paper documents in order to be able to respond rapidly to events and to cut down on cost.

Currently, manual operations continue to be the method of choice for processing paper documents. In general, a human operator first identifies the document and routes it appropriately. The document may then go through several stations before its processing is judged to be complete. At the end of the cycle, the document is typically archived in a storage filing cabinet according to some preset procedure. If at any later time this same document is needed again, a human operator retrieves it and the cycle starts over. Slow retrieval time, high probability of erroneous filing, and excessive cost associated with the storage space are known to be the major drawbacks of this approach.

The need for efficient methods to process paper documents is not new to the business community. In fact, this need has evolved over the last ten to fifteen years. In the past, businesses spoke of the need for better data management as a way to control the information that flows in and out of an organization. Currently, businesses speak of the need for better document management techniques instead. In the context of paper documents, this is taken to mean the need for more advanced methods to automate the handling of paper documents within an enterprise.

Approaches that attempt to address this problem are collectively referred to as document imaging systems. The basic function of a document imaging system is to convert the paper document into an image bitmap. This image bitmap, rather than the paper copy, is then stored in the system. Other functions may include document identification, attachment of a user identifying information, extraction of either partial or full text from the image, attachment of indexing information, attachment of tracking information, filing into a specific folder, routing over the network, archiving in a specific location, and retrieval.

Document imaging systems aim at providing greater efficiency, better ability of reuse, a reduction of product cycle time, and significant savings. However, this technology is still in its infancy and has been slow to deliver in its promise. A major hurdle has been that these systems are very difficult to fully automate. Human operators are still needed to identify and organize documents before they can be scanned into the system. This operation is time consuming and can reduce or eliminate the intended savings. Also, human operators are needed to enter the necessary keywords by which scanned documents can be retrieved. Manual entry of keywords is both slow and cumbersome, which impacts negatively on the overall efficiency of the system. Additional manual operations may also be needed to perform other tasks such as attachment of tracking information, filing into a specific folder, routing over the network, and archiving in a specific location. Manual functions limit the response time of the overall system as well as increase cost.

Optical Character Recognition technology has made it possible to automate the entry of keywords for the purpose of retrieving documents. It does so by converting the text in the image of the document to ASCII or other character code. In this case, any word in the extracted ASCII text can then be used to search for the document in question. This solution does not, however, address some rather common business needs. For instance, typical businesses process several classes of documents at any given day. In some situations, it may be desired to attach a different list of keywords to each different class of documents. This list may be used alone or in addition to the text extracted from the image. The list of special keywords may include the type of the document, the user ID, the owner of the document, the folder where the document is stored, and, perhaps, some other attributes that are relevant only to the class of documents to which they are attached. In other situations, one may wish to extract only keywords from a limited set of fields in the scanned document. In both of these cases, Optical Character Recognition alone is not sufficient.

Cover sheets or forms based methods have been proposed to deal with the problem of identifying documents at scan time. These same approaches have also attempted to resolve other tasks such as attaching tracking information, filing into a specific folder, routing over the network, and archiving in a specific location. Existing solutions are however, very limited, document specific, and not easy to generalize. Another issue inherent to document imaging systems is the limited amount of resources available for storing document images. This problem is exacerbated when duplicative images of documents are stored after documents are mistakenly input in the system multiple times. Therefore, there is a need for a file storage and retrieval system which allows any user to enter documents into the system and have the correct actions performed upon the document, and which alerts the user upon recognizing duplicative documents, to allow the user to delete duplicative images to conserve storage space.

DISCLOSURE OF INVENTION

The system of the present invention uses an attribute extracting module (256) to extract attributes from a document (50) input into the system. The system then uses an attribute comparison module (270) to compare the extracted attributes with multiple classes (54) of documents (56). Upon determining that the attributes of the document (50) match attributes of one of the classes (54), the document (50) is classified as belonging to the class (54) and is processed in accordance with the system actions associated with the matched class (54). In one embodiment of the present invention, the attributes of the input document (50) are then compared to the documents (56) belonging to the matched class (54) which are already on the system. If the system determines that the input document (50) matches one of the existing images (56), the user (240) is alerted that the input document (50) already exists in the system.

In a preferred embodiment, a match is determined in response to a comparison quality measure determined by a quality assessment module (258). The comparison quality measure measures the accuracy of the comparison. If the comparison quality measure exceeds a threshold, a match is determined to have been made. The comparison quality measure examines, among other factors, sizes, locations, and word accuracy values of matching regions within the input document (50) and the matching class (54) or document (56).

DETAILED DESCRIPTION OF THE PREFERRED EMBODIMENTS

Figure 1:
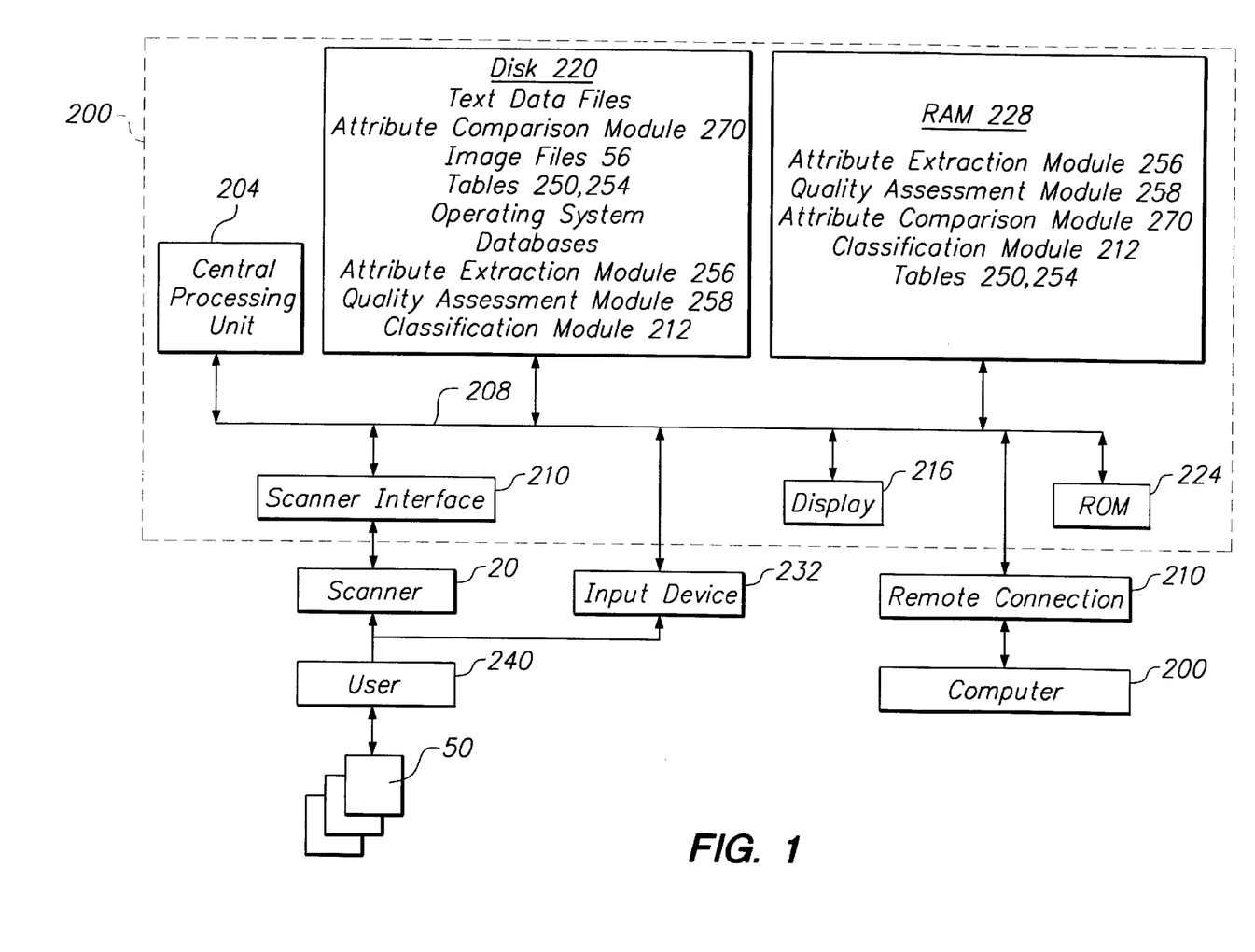
FIG. 1 is a block diagram illustrating a hardware embodiment of the present invention.

A preferred document imaging system is illustrated in FIG. 1. A user 240 inputs paper documents 50 into a scanner 20. The scanner 20 may be any conventional scanner. The scanner 20 digitizes the document 50 into a document bitmap. The bitmap is transmitted to a computer 200 through the scanner interface 210. The scanner interface 210 is a conventional interface which allows scanner 20 to transmit data to and receive data from computer 200.

A central processing unit 204 controls the functions associated with computer 200. Any conventional central processing unit 204 may be used, such as the Intel Pentium processor. The central processing unit 204 communicates with other components of computer 200 through a bus or buses 208. The bus or buses 208 provide channels for transmitting data.

Disk 220 provides storage for data useful to computer 200 and the user 240. The disk 220 typically stores text data files, image files 56 of documents 50, an operating system, and databases. In a preferred embodiment, disk 220 stores an attribute extraction module 256, a classification module 212, a quality assessment module 258, an attribute comparison module 270, and tables 250 and 254.

Also coupled to bus 208 is random access memory 228. Random access memory (RAM) 228 is memory which allows for faster retrieval of data. Central processing unit 204 typically stores frequently accessed data in RAM 228 for faster access. Thus, in one embodiment of the present invention, RAM 228 stores attribute extraction module 256, quality assessment module 258, attribute comparison module 270, classification module 212, table 250, and table 254. Read-only memory (ROM) 224 is memory which is used to store unchanging data, such as operating systems, BIOS, or other modules having unvarying functionality.

A display 216 is provided to display to user 240 the output of the scanner 20. The input device 232 allows user 240 to interact with the computer 200. The input device 232 may be a mouse, keyboard, trackball, or other cursor controlling device.

A remote connection 210 is provided to illustrate an alternate means of receiving a digital representation of a document 50. In this embodiment, a digital representation of a document 50 is received from a second computer 200 which transmits the digital representation to the first computer 200 for processing in accordance with the present invention. The data is transmitted to the remote connection 210, which is typically a modem coupled to a phone line.

The present invention takes advantage of the observation that each business processes only a limited number of classes 54 of documents 50 and that both the documents 50 and the manner in which these documents 50 are handled are highly structured. Typical business documents 50 may include several styles of contracts, a number of forms, a plurality of types of invoices, different variations of correspondences, various kinds of reports, and perhaps, other types as well. However, in the majority of cases, the type and the style of these documents 50 do not change from one instance to the other. For example, the first page of each report may have the same layout and may include information such as title, author, department, report number, and date. Similarly, all the letters generated by a business may also have the same layout and may include information such company logo, company address, words such as "To", "From", and "Reference". The same holds true for faxes and memoranda Contracts, invoices and forms handled by a particular business may also have the same layout and may include special words that do not change from one instance of the document 50 to another. As a result, it is possible to capture an accurate composite description of each class 54 of documents 50 and the set of operations it requires from a blank sample of this class 54. The extracted description is then stored in the system and used to automatically recognize other instances of the same class 54 of documents 56 that may be scanned into the system at any later time. However, in accordance with the present invention, a class 54 of documents 56 may include only one document 56. In this embodiment, a user 240 can design the system to detect other instances of a document 56 being input into the system to avoid duplicative document storage.

The extracted description referred to above is preferably composed of a set of attributes. The sets of attributes for the different classes 54 may be obtained from a variety of sources such as by use of a scan macro which extracts attributes upon execution, having the user 240 identify the attributes which represent the class 54, or, have the attributes extracted in accordance with the system disclosed in co-pending application "Document Indexing and Retrieval Using Layout Attributes," filed on May 7, 1998, assigned to the assignee of the present patent application which patent application in its entirety is hereby incorporated by reference into the present patent application. The set of attributes which represent a class 54 must be both representative and distinguishing for better document recognition accuracy. If the attributes are not representative enough, there would not be enough information such as to recognize that an input document 50 belongs to a class 54, resulting in the misclassification of documents 50.

Figure 2:
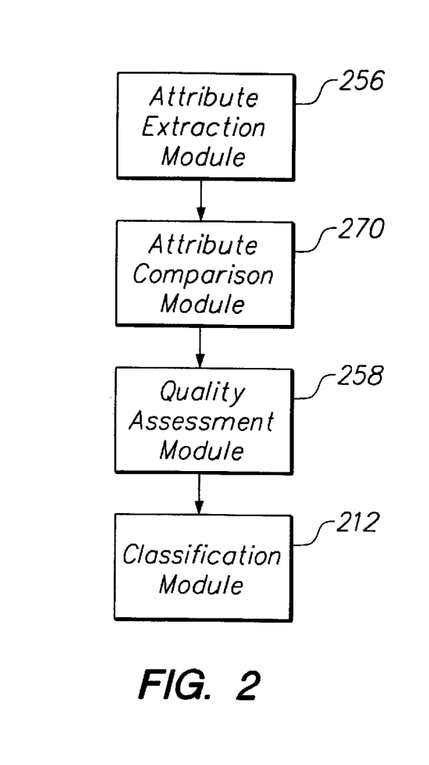
FIG. 2 is a top-level flow chart illustrating the process of recognizing a document 50 in accordance with the present invention.

FIG. 2 illustrates a preferred embodiment of the present invention. Attributes are extracted from the input document 50 by use of an attribute extracting module 256. Then, the attributes of the input document are compared to the sets of attributes representing the different classes of documents using an attribute comparison module 270. Next, a quality assessment module 258 is employed to assess the quality of the comparisons. Finally, a classification is made responsive to the quality assessment by the use of a classification module 212. The above modules may be implemented as hardware, firmware, and/or software.

Extracting attributes of an input document 50 may also be accomplished in a variety of ways, including by the use of the system disclosed in co-pending application "Document Indexing and Retrieval Using Layout Attributes," or by use of a scan macro which extracts attributes upon execution, or by having the user 240 identify the attributes to represent the document 50. The extracted attributes serve as an intuitive description of the document. For example, a description of a document could be: "The document has 7 regions. The first region is located at a certain location, $X_t$, $Y_t$, $X_b$, and $Y_b$. The region is a document title. The region contains large letters. The region contains the words "Canon" and "Report." The region contains the name of a month . . . " The other regions in the document are preferably described in a similar fashion. This set of attributes is then used by the attribute comparison module 270 to determine whether the document 50 is part of a class 54, and, additionally, determine whether a duplicate 56 of the document 50 already exists on the system.

Figure 3A:
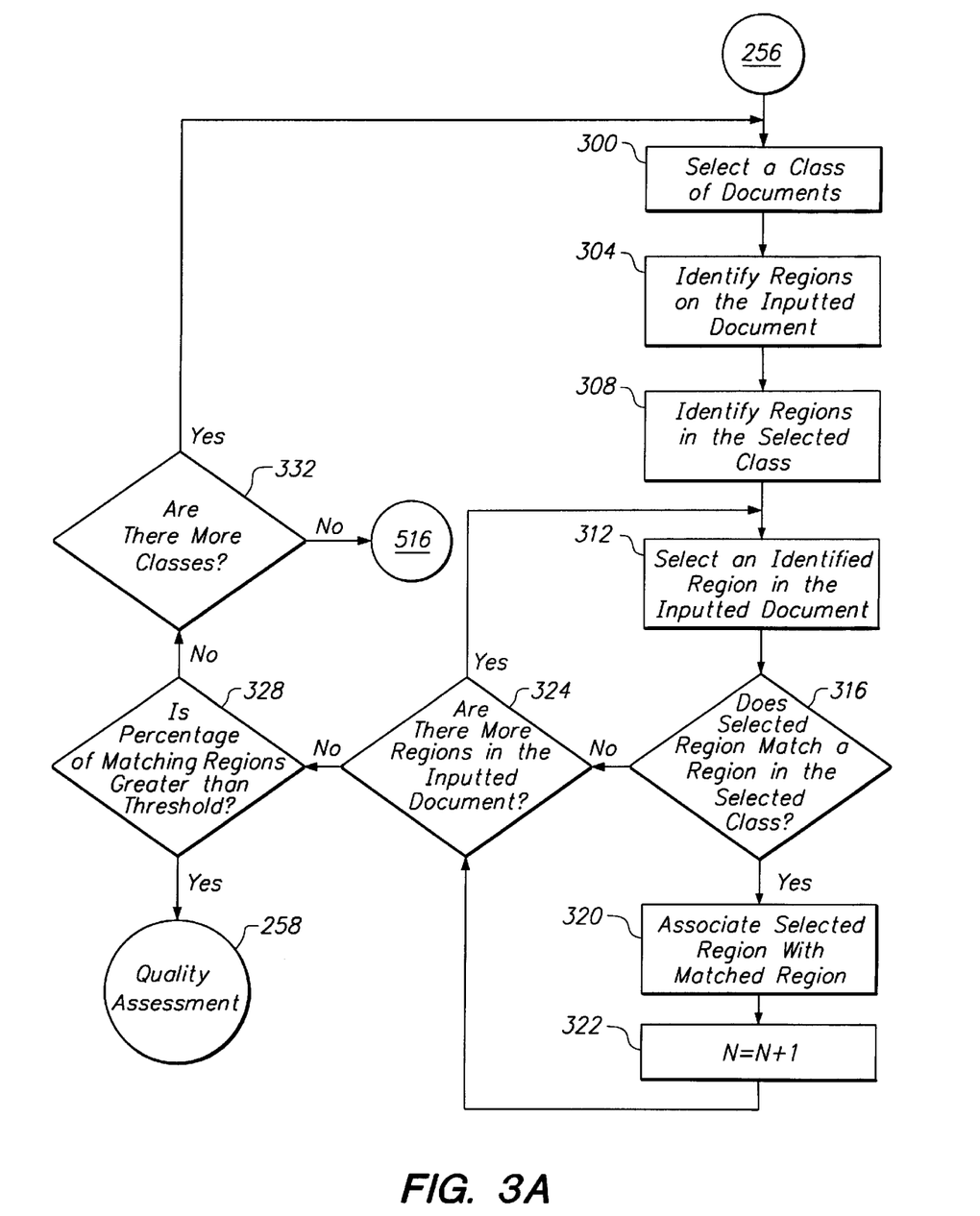
FIG. 3a is a flow chart illustrating comparing region-based attributes in accordance with the present invention.

FIG. 3a illustrates the process steps of comparing regions. First, a class 54 of documents 56 is selected 300 to be compared. Regions within the inputted document 50 are then identified 304. Documents 50 are typically composed of regions of data. For example, a document 50 may have a region of data containing a title, a region containing a block of text, a header, a graphic, a picture, letterhead, a footnote, or a unique sentence structure. Thus, a first step in layout attribute extraction is to identify 300 regions of data in the document 50. A preferred method of identifying regions of data in a document 50 using connected component data is performed in a manner as described in co-pending application "Page Segmentation and Character Recognition System," Ser. No. 08/228,359, filed on Apr. 15, 1989, which patent application is hereby incorporated by reference in its entirety into the present patent application. Connected component data are generated using a connected component processor. The processor analyzes an bitmap image pixel by pixel. If a selected pixel has a value greater than a threshold value, it is considered to contain data. If the selected pixel contains data and borders a pixel containing data, the bordering pixel and the selected pixel are grouped together as connected components. The region containing bordering pixels having data is expanded by pixel-by-pixel analysis, until pixels containing no data are found bordering the pixels in the region. At this point, the pixels are designated as being in a first connected component. Then, the connected components which are close to each other are grouped together as a region. Regions are considered separate if the space between the regions exceeds a threshold. Then, other regions within the bitmap document 50 are identified and designated as Region 2, Region 3, and so forth. However, other means may be used to identify regions within a document 50. For example, a bitmap image 56 of the document 50 may be displayed to the user 240, who may then designate the different regions in the image 56 by use of the input device 232.

Figure 3B:
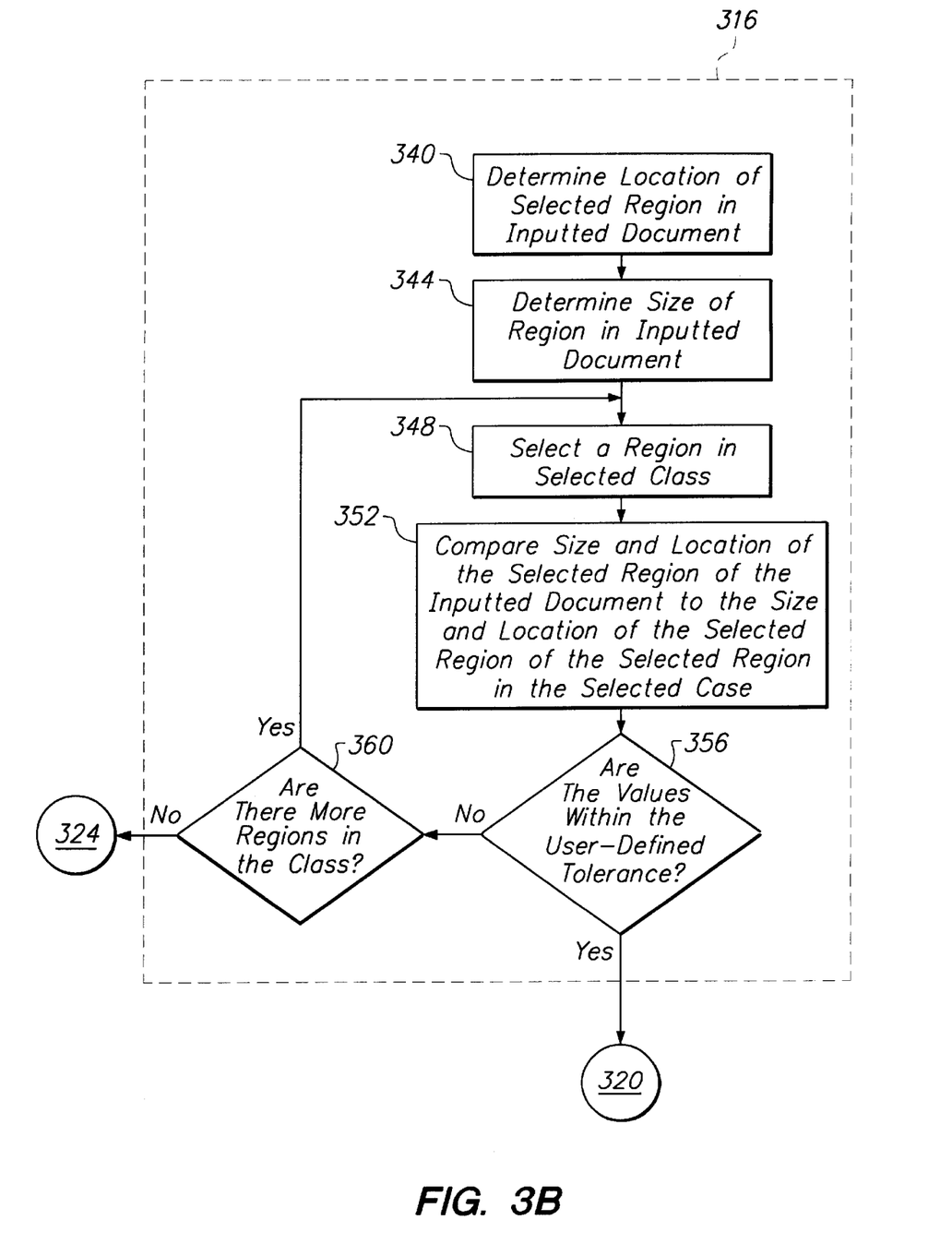
FIG. 3b is a flow chart illustrating determining matching regions in accordance with the present invention.

Regions are then identified 308 within the selected class 54. Typically, regions in a class 54 have already been identified at the time of creation of the class 54 by the process described above. A region is selected 312 in the inputted document 50 for comparison. The system determines 316 whether the selected region matches a region in the selected class. Regions in an inputted document 50 are determined to match regions in the selected class 54 by comparing the size and location of the identified regions as shown in FIG. 3b. First, the location of the identified region is determined 340 by extracting the coordinates of the region from the connected component data, next, a size of the identified region is determined 344 using the extracted coordinates of the located region.

A region in the selected class 54 is selected 348. This region may be determined in accordance with the process above or may be pre-defined. The size and location of the two regions are compared 352. The system determines 356 whether the size and location of the identified region of the inputted document 54 is with a user-defined tolerance of the region of the selected class 54. The user-defined tolerance is a value which sets how narrowly or broadly the system will make matches, thus allowing the user 240 to decide how inclusive the matching of the system should be. If the comparison yields a value that exceeds the tolerance, the system determines 360 whether there are more regions in the class 354. If there are, a next region is selected 348, and the above process is repeated. If the comparison yields a value within the tolerance, the selected region is associated 320 with the matched region, by the use of a table 250. Table 250 stores a listing of regions in an inputted document and their matching regions. Next, a counter is increased 322 to indicate that a match has been found for one region. The system determines 324 whether there are more regions within document 50.

If there are, a next region is selected 312 from the inputted document 50. This region is compared 316 to the regions in the selected class, and the above process is repeated. If there are no more regions within the document 50 or the system determined 316 that the region comparison was not within the user-defined tolerance, the system determines 328 whether the percentage of matching regions is greater than a threshold. The percentage is determined by dividing the number of regions which match as given by the counter by the total number of regions in the inputted document 50, and multiplying by one hundred. The threshold is a user or system-defined value which determines the percentage of regions in the inputted document 50 which must match regions in a class 54 prior to the inputted document 50 being considered a member of that class 54. For example, a user 240 may determine that 100 per cent of the regions in the inputted document 50 must match the regions in the class 54 prior to being considered a member of the class 54. Or, a user 240 may be more tolerant and decide that only 80 per cent of the regions have to match.

If the percentage of matching regions does not exceed the threshold, the system determines 332 whether there are more classes of documents stored on the system. Again, a class 54 of documents 56 includes either templates of documents 56 belonging to a category of documents 56 or individual instances of documents 50. If there are more classes 54, the system selects 300 a next class 54 of documents 56 to be compared and repeats the above process. If the percentage of matching regions does exceed the threshold, the system proceeds to assess the quality of the comparison.

Figure 4A:
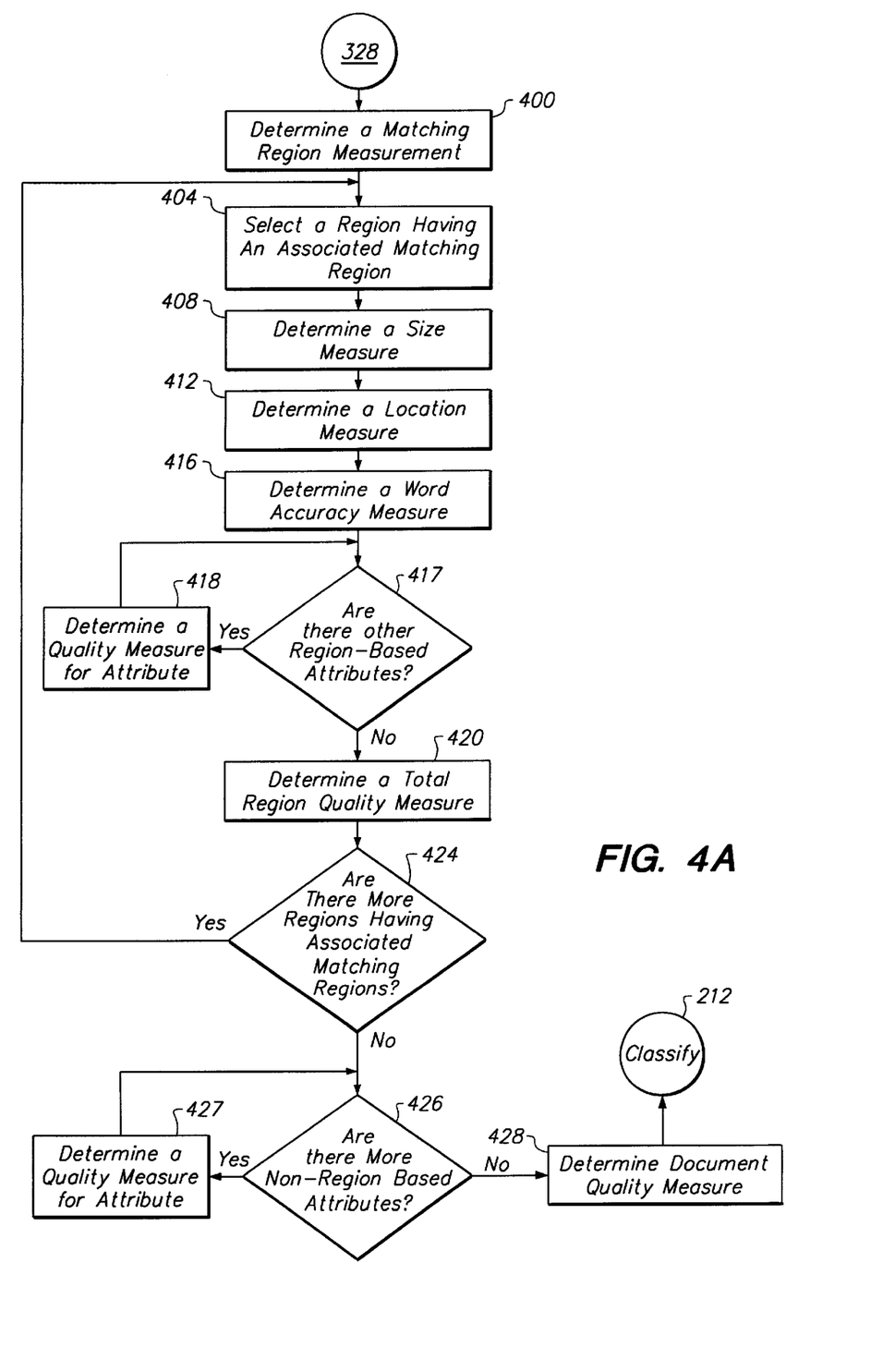
FIG. 4a illustrates obtaining quality measures in accordance with the present invention.

FIG. 4a illustrates the processing of a preferred embodiment of the quality assessment module 258. The quality assessment module is designed to assess the quality of the matches made between the inputted document 50 and the matching class 54 determined in accordance with FIG. 3a. The output of the quality assessment module 258 is a comparison quality measure which is used to determine whether a match has truly been found.

First, a matching region measurement, Jall, is determined 400. This value is the percentage value determined above which measures the number of regions in the inputted document 50 which match the regions in the matching class 54. This number is preferably normalized to be a value between zero and one.

Figure 4B:
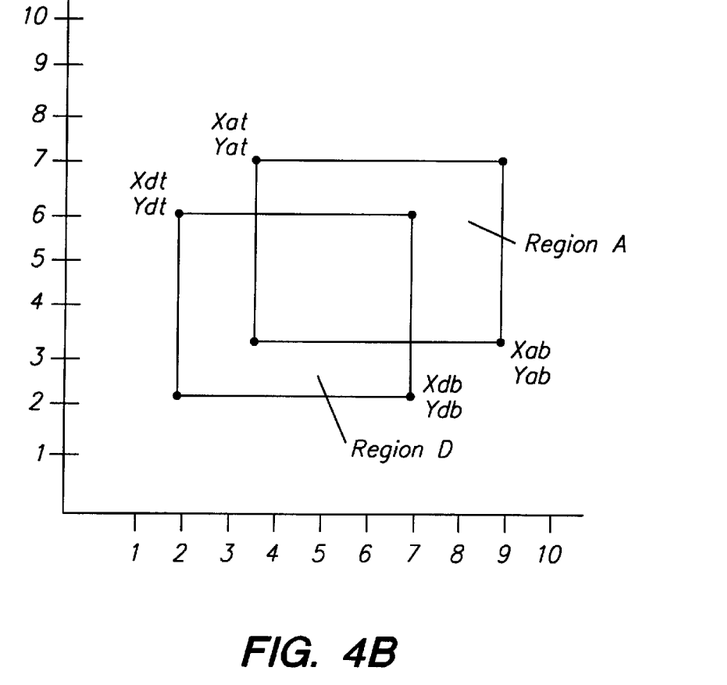
FIG. 4b illustrates two regions being compared in accordance with the present invention.

The regions having associated matching regions as indicated in table 250 are then examined to determine the quality of their match. A first region is selected 404 from table 250. As shown in FIG. 4b, the selected region in the inputted document 50 is compared against the matching region in the matching class 54. In FIG. 4b, Region A is the region in the inputted document 50 while Region D is the region in the class 54. The first attribute quality measure to be determined is the size measure. The size measure, Jsize, is preferably determined 408 for the match between the two regions by Jsize=1−∇size, where ∇size=/∇xd−∇xa/+/∇yd−∇ya/, and where ∇xd=Xdb−Xdt, ∇xa=Xab−Xat, ∇yd=Ydb−Ydt, and ∇ya=Yab−Yat. The size measurements are typically in hundreths of inches. As can be seen by the equation, the size measure measures a first difference as the difference between the X values of the top and bottom corners of region A and a second difference as the difference between the X values of the top and bottom corners of region D. Then, system subtracts the first and second differences. This is repeated for the Y values. The X difference and the Y difference are then added together to obtain the ∇size value. The size measure is 1−∇size. Thus, in accordance with the size measure, the closer in size the two regions are, the closer the final size measure will be to one.

The location measure, Jloc, is determined 412 by a similar technique. Jloc=1−∇loc, where ∇loc=/∇$_{xt}$/+/∇$_{yt}$/, and where ∇xt=Xdt−Xat, ∇yt=Ydt−Yat. The closer the two regions are on the page, the closer the location measure will be to one. Again, the values of the coordinates are typically in hundreths of inches.

The system determines 416 a word accuracy measure. A word accuracy measure is determined for the text contained within Region A and for the text within Region D. If the word accuracy values are close, then it is more likely that Region A is a true match for Region D. Word accuracy values are preferably described in accordance with co-pending patent application "Word Grouping Accuracy Value Generation," Ser. No. 09/041,854, filed on Mar. 12, 1988, which application is hereby incorporated by reference in its entirety into the present application. For regions which are, for example, headers, and are constant from document 50 to document 50 of a class 54, the text should be the same and the word accuracy measure measures this fact.

The system determines 417 whether there are other region-based attributes. If there are, the system determines 418 a quality measure for the attribute. Other attribute quality measures are preferably defined as Ja, where Ja=1 if Ja is found in the document and zero otherwise. For example, the size of characters in a region was an attribute described in the earlier example. Jcs would be the quality measure for that attribute, and Jcs would be one if the size of the character in the region matched the selected region, and zero otherwise. The name of a month was another attribute described in the example. Jwi would be the quality measure for that attribute, and Jwi would be one if the same month was found in the selected region and zero otherwise. Any other attribute describing a region on a document 50 could be defined similarly, as any characteristics or attributes of a region of a document may be used to compare two documents 50, 56 or a document 50 and a class 54.

After calculating the attribute quality measures, a total region quality measure, Jregi, where i is the region number, is determined 420. The total region quality measure is preferably determined by summing the attribute quality measures obtained above and dividing by the number of attributes examined by the system. In the above example, as five attribute quality measures are used, the total region quality measure is given by ⅕ *(Jsize+Jloc+Jword+Jcs+Jwi). After determining the total region quality measure, the system determines 424 whether there are more regions having associated matching regions as indicated by table 250. If there are, a next region is selected and the quality measures are determined as described above. If there are no more regions having associated matching regions, the system determines 425 quality measures for non-region-based attributes, and then forms 428 a document quality measure from the individual region and non-region quality measures.

One non-region based quality measure which is preferably used in accordance with the present invention is the relative region performance measure. This quality measure assesses the spatial relationship of each region with respect to other regions, such as, for example, determining whether regions are justified to the left or right side of a page. This provides additional information regarding whether an inputted document matches 50 a stored document 56 or belongs to a class 54. For example, a document 50 may have several regions which match a stored document 56 within the boundaries of a threshold. However, the regions may match only because the user defined tolerance is too broad and incorrectly permitted the comparison. In reality, the regions in the stored document 56 or class 54 may be flush left or right, and the regions in the inputted documents 50 may be some distance from the edges of the page, and therefore should not have been compared. Thus, the inputted document 54 may be incorrectly determined to match the stored document 56 or class 54 due to the tolerance.

In accordance with the present invention, therefore, the relative locations of the regions are stored as an attribute. Thus, if regions in a stored document 56 are located flush left, then regions in the inputted document 50 may be considered to match only if the regions are also flush left This attribute is preferably measured by subtracting the X values of each region in the stored document from every other region to obtain a relative X value for the stored document 56 or class 54 and subtracting the X values of each region in the inputted document 50 from every other region in the inputted document 50 to obtain a relative X value for the inputted document 50. The difference between the two relative X values, Jrel, measures the differences between the relative locations of the regions in the two documents 50, 56. Other spatial relations between regions may be defined depending upon the class of documents on hand. For example, a class 54 may define that region 2 is 2 inches to the right of region 1, and region 3 is 1 inch below region 1. Another non-region based quality measure used in accordance with the present invention is the presence of color within the document 50. In this embodiment, Jdc is the quality measure defining whether a document 50 has color or not. Jdc is one if document has color, and Jdc is zero otherwise.

The comparison quality measure, Jcomp, is preferably determined by Jcomp=(1/Number of non-region based quality measure*(Summation of Jpm values)+1/Number of Regions having matching regions*(Jreg1+ . . . +Jreg n))/2, where Jpm is the attribute quality measure. For example, for a document having twelve regions, two non-region based quality measures (Jrel and Jall), the Jcomp is given by:

Jcomp=(½*(Jall+Jrel)+ 1/12*(Jreg1+ . . . +Jreg12))/2. Other combinations of the quality measures may be used to arrive at a comparison quality measure in accordance with the present invention. For example, Jcomp may be given using scalars to emphasize the importance of each quality measure, as described below:

Jcomp=(½*(Ka11*Ja11+Kre1*Jrei)+¹⁄₁₂*(Kreg1*Jreg+ ... Kreg12*Jreg12)/2, where the k values are the scalars given for each quality measure. The user 240 can adjust the value of k to emphasize or deemphasize the importance of each quality measure.

In an alternate embodiment, Jcomp may be determined by a vote. In this embodiment, each region quality measure and non-region based measure are either one or zero depending upon whether they exceed a threshold. If the majority are determined to be zero, Jcomp is zero. If the majority are determined to be one, Jcomp is one.

Figure 5:
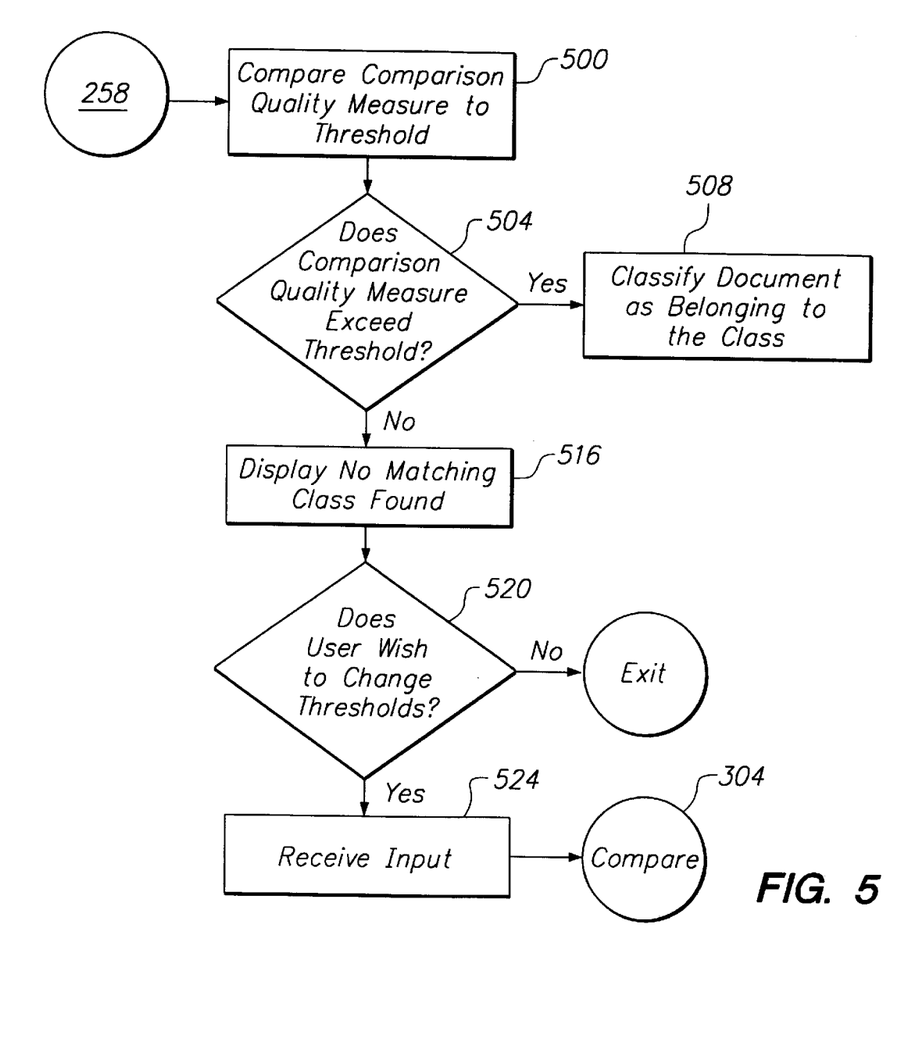
FIG. 5 is a flowchart illustrating classifying a document 50 in accordance with the present invention.

FIG. 5 illustrates the classification processing in accordance with the present invention. The system compares 500 the comparison quality measure to a threshold. The threshold is a value which sets the quality level of the document recognition system. The threshold may be set by a user 240 or by the system. For example, if a user 240 wants higher accuracy in the system, the user 240 sets the threshold to a high value. A high threshold allows only those documents 50 which have a high comparison quality measure to be classified as matching. The user 240 preferably adjusts this threshold until the system is operating at a satisfactory level for the user 240.

The system determines 504 whether the comparison quality measure exceeds the threshold. If the comparison quality measure exceeds the threshold, the document 50 is classified 508 as belonging to the matching class 54, or, alternatively, is classified as matching the document 56 to which it is being compared.

If the comparison quality measure does not exceed the threshold, the system displays 512 a message to the user 240 that no match was found. The system then displays 520 a message asking the user 240 whether the user 240 would like to change the various thresholds in the system and re-compare the document 50. This option allows for feedback adjustment of the thresholds to allow the user 240 to optimize the system. The user 240 may change the size and location tolerances used in matching identified regions to pre-defined regions, the threshold used in comparing the comparison quality measure, or any of the other thresholds used in the system. After receiving 524 input for altering the thresholds, the system proceeds to locate 304 regions in the inputted document 50, and then continues on as described above.

Figure 6:
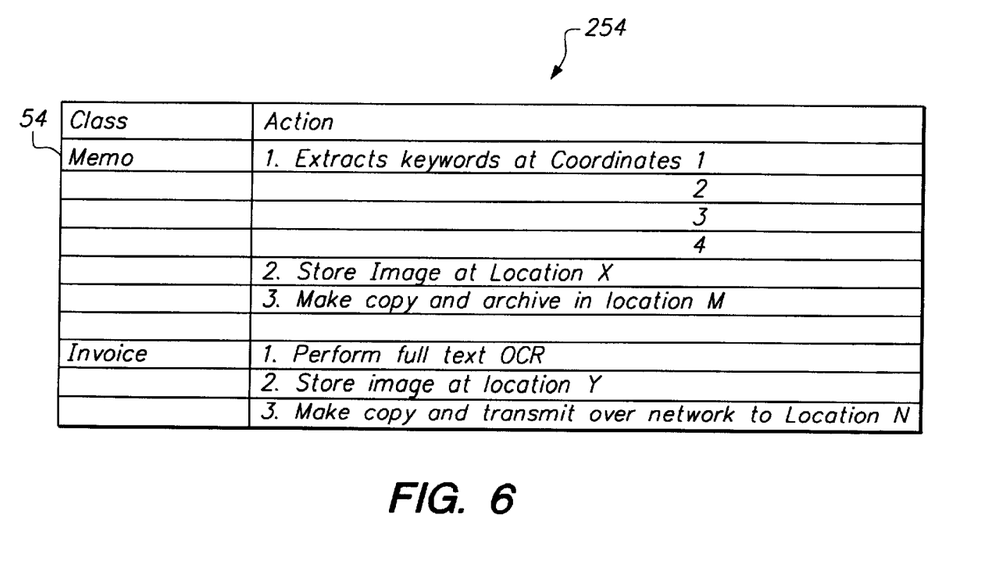
FIG. 6 illustrates a document class-system action table 254 in accordance with the present invention.

FIG. 6 illustrates a document class-system action table 254 used in a further embodiment of the present invention. The table 254 associates document imaging system actions with each stored class. For example, the "Memo" class 54 has actions predefined for it including extracting keywords at several locations, storing the image 56 at a predefined location on the disk 220, and archiving a back-up copy at another location. A name for the document 50 may be automatically generated or a name may be requested from the user 240. Thus, once a document 50 has been defined to be a part of the "Memo" class 54 by the above process, the associated actions are performed upon the document 50 automatically.

In an alternate embodiment of the present invention, inputted documents 50 may be recognized as being documents 56 which are already on the computer system. In this embodiment, an inputted document 50 has attributes extracted as described above. However, the attributes are now compared against extracted attributes of other documents 56 present on the system to determine whether there is a match. The word accuracy quality measure is more significant in this embodiment, as the words within regions should match if the inputted document 50 is the same as the matching document 56. For example, if a document 50 has a report number and a matching report number is found in another document 56, the other attributes are more carefully examined. For example, a set of higher thresholds may be used for the comparison, to determine more precisely whether the document 50 is a duplicate. Additionally, text that are not part of the defined attributes in document 56 and 50 are also compared to determine a match for example by looking at the text after a "From" field to determine an author's name for comparison. The word accuracy measure may also be emphasized by adding a scalar value to the word accuracy quality measure. In a modification of the document matching embodiment, the inputted document 50 is compared with only the documents 56 belonging to a class 54 which match the inputted document 50. This optimizes the recognition process as it is much faster to compare a subset of all documents 56 to the inputted document 50, than it is to compare the inputted document 50 with every document 54 on the system.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for automatically recognizing documents in a document imaging system where attributes of classes of documents are stored in a computer system, said method comprising the steps of:

receiving a qualitative selection of a region of data in a document representative of a class of documents, wherein the qualitative selection describes a distinguishing feature of the class of documents;

assigning the qualitative selection as an attribute of a class of documents;

storing the assigned qualitative attribute with an identification of the class of documents to which it belongs;

extracting regions of data from a document inputted into the document imaging system;

comparing extracted regions of data with stored qualitative attributes associated with stored classes of documents; and responsive to the extracted regions of data matching the stored attributes of one of the classes of documents, classifying the inputted document as belonging to the class of documents whose attributes match the attributes of the inputted document.

2. The method of claim 1, wherein the comparing step further comprises the substep of obtaining a comparison quality measure for each comparison, and wherein the classifying step further comprises the substep of classifying the inputted document as belonging to a class of documents in response to the comparison quality measure for the comparison between the inputted document and the class of documents exceeding a threshold.

3. The method of claim 1 wherein attributes are stored for documents stored on the computer system, the comparing the extracted attributes step further comprises comparing the extracted attributes with the attributes of the documents stored on the computer system, and the classifying step further comprises the substep of:

responsive to the extracted attributes matching the attributes of one of the stored documents, classifying the inputted document as matching the stored document.

4. The method of claim 3 wherein the inputted document is compared to documents on the computer system who are members of the class to which the inputted document belongs.

5. The method of claim 3 further comprising the step of:
responsive to classifying the inputted document as matching the stored document, displaying a message that the inputted document is duplicative of a document stored on the system.

6. The method of claim 1 further comprising the step of:
responsive to the document being classified as belonging to a class of documents, performing document imaging actions associated with the matching class on the inputted document.

7. The method of claim 6 wherein document imaging actions include storing an image of the inputted document into a predetermined file location on a disk.

8. The method of claim 6 wherein document imaging actions include extracting a keyword from the inputted document.

9. A method for automatically recognizing documents in a document imaging system where attributes of classes of documents are stored in a computer system, said method comprising the steps of:
extracting attributes from a document inputted into the document imaging system;
comparing extracted attributes with attributes of the stored classes of documents wherein the comparing extracted attributes step further comprises the substep of obtaining a comparison quality measure for each comparison;
and wherein the step of obtaining a comparison quality measure further comprises the substeps of:
selecting one of the classes of documents for comparison;
identifying regions in the inputted document;
identifying regions in the selected class;
determining a number of regions in the inputted document which match regions in the selected class;
determining a comparison quality measure in response to the number of regions in the inputted document which match regions in the selected class; and
repeating the selecting one of the classes of documents for comparison, identifying regions in the selected class, determining a number of regions in the inputted document which match regions in the selected class, and determining a comparison quality measure substeps until all of the classes have been compared and
responsive to the extracted attributes matching the attributes of one of the classes of documents, classifying the inputted document as belonging to the class of documents whose attributes match the attributes of the inputted document and wherein the classifying step further comprises the substep of classifying the inputted document as belonging to a class of documents in response to the comparison quality measure for the comparison between the inputted document and the class of documents exceeding a threshold.

10. The method of claim 9 wherein the identifying regions in the inputted document step comprises the substep of locating areas of black pixels surrounded by white pixels in the inputted document; and the determining a number of regions in the inputted document which match regions in the selected class step further comprises the substeps of:
comparing the identified regions to pre-defined regions in the selected class; and
responsive to a identified region matching one of the pre-defined regions, associating the identified region with the matching region.

11. The method of claim 10 wherein the substep of comparing the identified regions to pre-defined regions in the selected class substep further comprises the substeps of:
determining a size of the identified region;
determining a location of the identified region;
selecting a pre-defined region from the selected class for comparison;
comparing the size of the identified region to the size of the selected pre-defined region;
comparing the location of the identified region to the location of the selected predefined region;
responsive to the size and location of the identified region matching the pre-defined region within a user-defined tolerance, classifying the identified region as a matching region; and
repeating the selecting a pre-defined region, comparing the size of the identified region, comparing the location of the identified region, and the classifying substeps in response to the size and location of the identified region not matching the pre-defined region within a user-defined tolerance, until all of the pre-defined regions have been compared.

12. The method of claim 10 wherein the user-defined tolerance is adjusted in response to the comparison quality measure being less than the threshold.

13. The method of claim 9, further comprising the step of determining a total region quality measure, and wherein the comparison quality measure is determined by a logical combination of the number of regions in the inputted document which match regions in the selected class and the total region quality measure.

14. The method of claim 13, wherein the step of determining a total region quality measure further comprises the substeps of:
selecting a region in the inputted document having a matching region in the selected class;
determining a location measure for the selected region;
determining a size measure for the selected region;
determining a region quality measure from a logical combination of the location measure and the size measure;
repeating the selecting a region, determining a location measure, determining a size measure, and determining a region quality measure substeps for each region having a matching region in the selected class; and
obtaining a total region quality measure from the logical combination of the determined region quality measures.

15. The method of claim 14 wherein a word accuracy measure is determined, and the region quality measure is determined from a logical combination of the word accuracy measure, the location measure, and the size measure.

16. The method of claim 14 wherein the determining a location measure step further comprises the substeps of:
determining a location of the selected region;
determining a location of the matching region;

comparing the locations of the selected and matching regions; and responsive to the comparison, generating a location measure.

17. The method of claim 14 wherein the determining a size measure step further comprises the substeps of:

determining a size of the selected region;

determining a size of the matching region;

comparing the sizes of the selected and matching regions; and responsive to the comparison, generating a size measure.

18. The method of claim 13 further comprising the step of determining a non-region based quality measure, and wherein the comparison quality measure is determined by the logical combination of the non-region based quality measure, the total region quality measure, and the number of regions in the inputted document which match regions in the selected class of documents.

19. A computer apparatus comprising:

RAM, for temporarily storing a created digital image;

coupled to the RAM, a central processing unit, for receiving a qualitative selection of a region of data in a document representative of a class of documents, wherein the qualitative selection describes a distinguishing feature of the class of documents; assigning the qualitative selection as an attribute of a class of documents; storing the assigned qualitative attribute with an identification of the class of documents to which it belongs; extracting regions of data from the digital image of the paper document, comparing extracted regions of data to stored qualitative attributes associated with classes of documents, and classifying the digital image of the paper document responsive to the comparison; and coupled to the central processing unit, a storage device, for storing attributes of the classes of documents.

20. A computer-readable medium containing a computer program for processing documents in a document imaging system, wherein a paper copy of the document to be processed is transformed into a digital version of the document, and the computer program causes the processor to receive a qualitative selection of a region of data in a document representative of a class of documents, wherein the qualitative selection describes a distinguishing feature of the class of documents, assign the qualitative selection as an attribute of a class of documents, store the assigned qualitative attribute with an identification of the class of documents to which it belongs, extract regions of data from the digital image of the paper document, compare extracted regions of data to stored qualitative attributes associated with classes of documents, and classify the digital image of the paper document as belonging to a class of documents responsive to the comparison.

21. A computer-readable medium containing a computer program for processing documents in a document imaging system, wherein a paper copy of the document to be processed has been transformed into a digital version of the document, and the computer program causes the processor to perform the steps of:

extracting attributes from a document inputted into the document imaging system;

comparing extracted attributes with attributes of stored classes of documents, including obtaining a comparison quality measure for each comparison comprising:

selecting one of the stored classes of documents for comparison;

identifying regions in the inputted document;

identifying regions in the selected class;

determining a number of regions in the inputted document which match regions in the selected class;

determining a comparison quality measure in response to the number of regions in the inputted document which match regions in the selected class;

repeating the selecting one of the stored classes of documents for comparison, identifying regions in the inputted document, identifying regions in the selected class, determining a number of regions in the inputted document which match regions in the selected class, and determining a comparison quality measure substeps until all of the stored classes have been compared; and responsive to the extracted attributes matching the attributes of one of the stored classes of documents, classifying the inputted document as belonging to a class of documents; whose attributes match the attributes of the inputted document and wherein the classifying step further comprises the substep of classifying the inputted document as belonging to a class of documents in response to the comparison quality measure for the comparison between the inputted document and the class of documents exceeding a threshold.

22. A computer apparatus comprising:

RAM, for temporarily storing a created digital image;

an attribute extracting module, coupled to the RAM, for extracting attributes from a document inputted into the document imaging system;

a storage device, coupled to the attribute extraction module, for storing attributes of the classes of documents;

an attribute comparison module, coupled to the attribute extracting module, for selecting one of the classes of documents for comparison; identifying regions in the inputted document; identifying regions in the selected class; and determining a number of regions in the inputted document which match regions in the selected class;

a quality assessment module, coupled to the attribute comparison module, for determining a comparison quality measure in response to the number of regions in the inputted document which match regions in the selected class; and a classification module, coupled to the quality assessment module, for classifying the inputted document as belonging to a class of documents in response to the comparison quality measure for the comparison between the inputted document and the class of documents exceeding a threshold.

* * * * *